United States Patent [19]

Hwang

[11] 4,064,336

[45] Dec. 20, 1977

[54] CATALYST AND METHOD

[75] Inventor: Yu-Tang Hwang, Clinton, Iowa

[73] Assignee: Chemplex Company, Rolling Meadows, Ill.

[21] Appl. No.: 738,554

[22] Filed: Nov. 3, 1976

[51] Int. Cl.$^2$ .......................... C08F 4/78; C08F 10/00
[52] U.S. Cl. ................................ 526/172; 252/429 R; 252/430; 252/431 R; 526/106; 526/123; 526/130; 526/154; 526/352
[58] Field of Search ............... 526/106, 123, 130, 154, 526/172; 252/429 R, 430, 431 R

[56] References Cited

U.S. PATENT DOCUMENTS

| 3,324,092 | 6/1967 | Naarmann et al. | 526/172 |
| 3,860,568 | 1/1975 | Chabert et al. | 526/123 |
| 3,953,413 | 4/1976 | Hwang et al. | 526/350 |
| 3,986,983 | 10/1976 | Hoff et al. | 252/431 R |

FOREIGN PATENT DOCUMENTS 1,128,724  10/1968  United Kingdom ................. 526/123

Primary Examiner—Alan Holler
Attorney, Agent, or Firm—Wegner, Stellman, McCord, Wiles & Wood

[57] ABSTRACT

A new catalyst and method of making polymers therewith and the process of preparing the catalyst in which the catalyst is prepared by dispersing on a finely divided carrier material, particularly a difficulty reducible inorganic support such as silica, an organic chromium compound or complex such as a chelate derived from an N-nitroso-substituted N-arylhydroxylamine, N-nitroso-substituted hydroxamic acid, N-aryl-substituted hydroxamic acid, or an aromatic hydroxamic acid with or without an N-substituent and activating the resulting mixture by heating at an elevated temperature in a non-oxidizing atmosphere.

41 Claims, No Drawings

CATALYST AND METHOD

CROSS REFERENCE TO RELATED PATENT

Hwang & Grimmett U.S. Pat. No. 3,953,413 covering essentially chromium chelates of beta-dicarbonyl compounds as catalyst ingredients. The above patent is assigned to the assignee hereof.

BACKGROUND OF THE INVENTION

The new and improved catalysts and methods of this invention involve dispersing on a finely divided and difficult to reduce inorganic oxide selected from silica, alumina, thoria, zirconia, titania, magnesia and mixtures or composites thereof an organic chromium compound or complex such as a chelate derived from an N-nitroso-substituted N-arylhydroxylamine, N-nitroso-substituted hydroxamic acid, N-aryl-substituted hydroxamic acid, or an aromatic hydroxamic acid with or without an N-substituent, and activating the resulting mixture by heating to and at an elevated temperature in a non-oxidizing atmosphere with a specific temperature range being within about 600°–2000° F.

SUMMARY OF THE INVENTION

In accordance with this invention, 1-olefins of 2 to 8 carbon atoms are polymerized or copolymerized with $C_2$–$C_{20}$ 1-olefins to form solid polymers or copolymers in the presence of the catalyst of this invention which comprises essentially low-valent chromium surface species as an active ingredient dispersed and supported on at least one difficult to reduce inorganic oxide.

More uniquely, the novel catalyst is prepared by dispersing on a finely divided inorganic support of the class consisting of silica, alumina, thoria, zirconia, magnesia, titania and mixtures and composites thereof an organic chromium-bearing compound or mixture consisting essentially of an organic chromium compound or complex such as a chelate derived from an N-nitroso-substituted N-arylhydroxylamine, N-nitroso-substituted hydroxamic acid, N-arylsubstituted hydroxamic acid, or an aromatic hydroxamic acid with or without an N-substituent and activating the resulting mixture by heating to and at an elevated temperature of from about 600°–2000° F. in a non-oxidizing atmosphere.

DESCRIPTION OF THE PREFERRED EMBODIMENTS

In accordance with this invention polymerizable olefinic compounds and especially 1-olefins of 2–8 carbon atoms are polymerized or copolymerized with $C_2$–$C_{20}$ 1-olefins to form solid polymers and copolymers in the presence of the novel catalyst of this invention which is further specified as follows.

The organic chromium compounds or complexes suitable for preparation of the catalyst of this invention include virtually all the chromium complexes such as chelates derived from an N-nitroso-substituted N-arylhydroxylamine, N-nitroso-substituted hydroxamic acid, N-aryl-substituted hydroxamic acid, or an aromatic hydroxamic acid with or without an N-substituent, the compound or complex (e.g. a chelate or a salt) being essentially of the formula

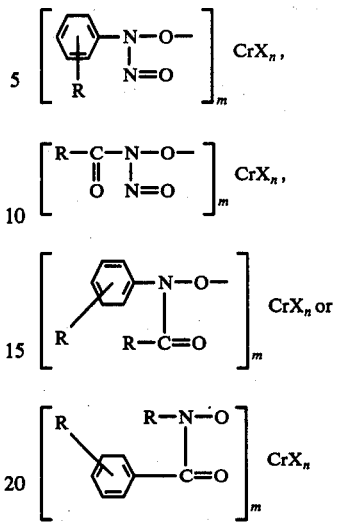

wherein R is individually selected from hydrogen, alkyl, alkenyl, aryl, cycloalkyl, cycloalkenyl, and arylalkyl radicals and combinations of these radicals with each R containing 0–20 carbon atoms and a corresponding valence-satisfying number of hydrogen atoms, $m$ is a whole number of 1 to 3, $n$ is a whole number of 0 to 2, and $m$ plus $n$ is 2 or 3, and X is an inorganic or organic negative group relative to chromium such as halide, alkyl, alkoxy, and the like. Typical chromium compounds of the above description are chromium (III) cupferronate (chromium derivative of N-nitroso-N-phenylhydroxylamine), chromium (III) N-phenylbenzohydroxamate, chromium (III) benzohydroxamate, and chromium (III) N-nitroso-benzohydroxamate.

Catalyst Preparation

In preparing a catalyst of this invention a series of steps are normally taken as follows, some being optional as indicated.

Pretreatment of Support

The catalyst support, selected from silica, alumina, zirconia, thoria, magnesia, titania, or mixtures and composites thereof resulting from coprecipitation, impregnation, vapor-phase deposition, etc. may have surface areas ranging from a few $m^2/g$ to over 700 $m^2/g$ but preferably above 150 $m^2/g$. Pore volume is preferably in excess of 0.5 cc/g if surface area is primarily related to micropores. A finely divided non-porous support with relatively high surface area such as "Cab-O-Sil" may also be used in this invention.

Although not required, pretreatment of the support prior to its impregnation with an appropriate organic chromium compound is often preferred. Such pretreatment typically consists of adjusting the moisture content of the support by drying at elevated temperatures or chemically modifying the support with compounds containing metallic elements such as zirconium, titanium, boron, vanadium, tin, molybdenum, magnesium, hafnium or the like. Chemical modification may include adding compounds such as ammonium hexafluorosilicate which can react with the support or with the organic chromium compound during activation. Chemical modification using metal alkyls which react with the support can also be used.

The chemically modified support, especially when involving the aqueous solution impregnation, is generally calcined at elevated temperatures to fix a modifier onto the support and also to expel an excess amount of moisture, much the same way as adjusting the moisture content in the unmodified support. The calcining or drying step is normally carried out at temperatures from 300°–2000° F. and can be done by any process known in the art such as in a muffle furnace or in a heated fluidized bed using gases such as nitrogen, air, carbon monoxide, or other suitable reactive or inert gases as fluidizing gases.

Dispersion of the Chromium-Bearing Compound or Mixture on the Support

The dispersion of the chromium-bearing compound or mixture on the support can be readily accomplished by a conventional impregnation method using an organic solvent such as acetone, dichloromethane, toluene or hexane. Equally satisfactory dispersion is often achieved by a more convenient method which calls for dry-blending of the chromium-bearing compound or mixture with the support and effecting the final dispersion during the initial state of activation. If such a dry-blending technique is used, the subsequent activation is best carried out in the fluid-bed operation. The optimum chromium content of the catalyst is dependent on the support type, surface area and pore structure. With a typical support whose surface area is 100–800 m²/g and total pore volume is 0–3.0 cc/g, the chromium level may range from 0.05 to 10% with the preferred level somewhere around 0.1–2.0 weight percent on the dry basis.

Thermal Activation of the Catalyst in Non-Oxidizing Atmosphere

In accordance with this invention, the non-oxidizing atmosphere is provided either by an inert gas such as nitrogen, helium, argon, etc., by a reducing gas such as carbon monoxide, hydrogen, etc., or by evacuation to a sufficiently high vacuum. In the latter case, it is desirable to permit deliberate leak-in of a small amount of non-oxidizing gas. In all cases, a mixture of non-oxidizing gases may be used, if desired.

When the activation is carried out in a non-oxidizing (inert or reducing) gas atmosphere, either fluid-bed or stationary-bed operation may be used. Experience, however, shows that fluid-bed operation is preferable. Normally, for economic reasons, deoxygenated nitrogen is used to fluidize the catalyst in an activator. It was experimentally established that even a minute contamination of oxygen during the activation generally has a detrimental effect on catalyst activity, and that such an adverse effect is greatly magnified when the chromium level is reduced to about 0.15% from a more typical 1 weight percent, often to the extent of completely deactivating the catalyst.

The activation step is usually carried out using a preselected heating cycle which includes heating the catalyst up to a specific temperature, usually in the range of 600°–2000° F., holding the catalyst at this temperature for a prescribed length of time, usually 30 minutes to 12 hours, followed by cooling to ambient temperature in nitrogen atmosphere. The heating cycle may also include one or more hold periods at temperatures below the maximum, as mentioned above, to permit diffusion of moisture, solvent or gaseous products from the catalyst pores, or to permit reactions such as decomposition of the surface organic chromium species to take place. The final activation temperature is usually selected on the basis of several factors, such as desired resin properties, support type, pretreatment, etc. The heat-up rate above 600° F. is generally not critical.

Polymerization Processes

The novel catalysts of this invention may be used to produce polymers and copolymers in liquid-phase, solution or slurry processes or vapor-phase processes. In the liquid-phase operation, any $C_3$–$C_{12}$ saturated liquid hydrocarbon may be used as a reaction medium or diluent. Other types of solvents including aromatic hydrocarbons and chlorinated solvents may also be used. The polymerization of 1-olefins may be carried out in batch or continuous process. The catalyst is generally charged into the reactor as a slurry in the continuous process, but as dry powder in the batch process. The mode of charging the solvent and olefin to the reactor system may follow any conventional practice applicable to batch or continuous operation, respectively. A vigorous agitation of the reaction medium is of course greatly preferred and so is the provision for efficient cooling to control the reactor temperature.

In liquid-phase processes, the olefin polymer or copolymer is normally recovered by flashing off solvent without any intervening steps for removal of the catalyst. The activity of the catalysts described in this invention is normally greater than 3000 pounds of polymer per pound of catalyst so that catalyst removal is unnecessary for practical purposes. Reactor conditions are dependent on the type of olefin as well as the desired polymer properties. In the case of ethylene, reactor pressures may range from 50 to 1000 psig, temperatures from 150°–500° F. and solid levels from 5–60% by weight.

The following examples illustrate the invention.

EXAMPLE 1

A chromium (III) derivative of cupferron, also called chromium cupferronate, was prepared by the metathetical reaction between cupferron (ammonium salt of N-nitroso-N-phenylhydroxylamine) and chromium trichloride in an ammoniacal aqueous medium. Specifically, 100 grams of cupferron and 63 grams of chromium trichloride were first dissolved in 350 and 250 ml water, respectively. These two solutions were then mixed together followed by adjusting the pH of the reaction mixture to about 8~9 with ammonium hydroxide. There was recovered a fair amount of dark green precipitate which was washed several times with water until no more soluble green color was observed in the wash water. The dark green precipitate was then dissolved in 2100 ml acetone and the insolubles were filtered off. By evaporating the filtrate, there was obtained a dark green residue weighing about 35 grams. The residue thus obtained was a partially purified chromium cupferronate.

A catalyst was prepared by the following steps:

1. About 10 pounds of Davison 952 MS-ID silica gel, having about 350 m²/g surface area and 1.70 cc/g total pore volume, was dried in the pilot plant scale activator, essentially a 12 inch I.D. by 30 inch long cylinder equipped with a gas dispersing plate and an encircling electrical heater. The actual drying was accomplished in the fluid bed maintained by 100 SCFH of air and held at 1300° F. for 5 hours.

2. 30.0 grams of this predried silica was impregnated with a 90 ml acetone solution containing 2.7 grams of the chromium derivative of N-nitroso-N-phenylhydroxylamine just described.

3. The solvent was then evaporated off at 85°–150° F. by nitrogen sweep until the catalyst became free flowing. This drying step always followed the impregnation using organic solvent, and its mention will be omitted in the subsequent examples for simplicity.

4. About 15 grams of this impregnated and partially dried catalyst was charged into a catalyst activator consisting of a 38mm O.D., 27 inch long Vycor glass tube, fitted with a fritted disc in the mid-section of the tube for the purpose of fluidizing the catalyst and provided with tubular electrical heaters around the tube for adjusting the catagrams of this impregnated and partially dried catalyst was charged into a catalyst activator consisting of a 38mm O.D., 27 inch long Vycor glass tube, fitted with a fritted disc in the mid-section of the tube for the purpose of fluidizing the catalyst and provided with tubular electrical heaters around the tube for adjusting the catalyst temperature. The catalyst was then fluidized with a flow of deoxygenated nitrogen, approximately 400 cc/minute, and activated according to the following heating cycle: (a) hold at 250° F. for 1 hour, (b) hold at 350° F. for 1 hour, (c) hold at 550° F. for 1 hour, (d) raise 200° F. every 15 minutes up to 1600° F., (e) hold at 1600° F. for 2 hours, and (f) cool down to ambient temperature in nitrogen atmosphere. The deoxygenated nitrogen used in this and subsequent examples was obtained by passing high purity nitrogen through a bed of reduced copper catalyst.

5. The catalyst thus activated was transferred into a closed flask equipped with a hose-and-clamp at both openings without exposing it to air. This step was also applicable to all the subsequent examples and its mention hereafter will be omitted for simplicity.

Evaluation of the activated catalyst for its ethylene polymerization activity was carried out in accordance with a general procedure as follows. The reactor, essentially an autoclave 5 inches I.D. and about 12 inches deep, was equipped with an agitator rotating at 560 rpm, a flush bottom valve, and three ports for charging catalyst, isobutane, and ethylene, respectively. The reactor temperature was controlled by a jacket containing methanol which was kept boiling by an electrical heater encircling the jacket. The control mechanism involved the automatic adjustment of jacket pressures in response to either cooling or heating requirements.

To test a catalyst, the reactor was first thoroughly purged with ethylene at temperatures around 200° F., followed by the transfer of 0.05–0.5 g of catalyst from a catalyst flask under nitrogen into the reactor via a transfer tube without exposing it to air. After the catalyst charge port was closed, 2900 ml of isobutane (dried and deoxygenated) was charged into the reactor, trapped ethylene was vented, and the reactor was allowed to warm up to 225° F. The reactor was then pressurized with ethylene which was regulated at 550 psig and which was permitted to flow into the reactor whenever the reactor pressure dropped below 550 psig. An instantaneous flow rate of ethylene was monitored by rotameters of various capacity. The duration of a test run was normally from 40 minutes to 4 hours depending on the polymerization rate or desired productivity.

At the end of a test run, ethylene flow was cut off, the flush bottom valve was opened, and the reactor content was dumped into a recovery pot, approximately 5 inches I.D. and 10 inches deep, where isobutane was allowed to flash off through a 200 mesh screen into the vent. Polymer particles left in the pot were recovered and weighed.

In this particular case, the activated catalyst was tested twice. The first run involved a catalyst charge of 0.1877 g, lasted for 60 minutes, and resulted in the recovery of 112 grams of polymer having the unmilled resin melt index of 0.40. The second run used a catalyst charge of 0.1462 g, terminated after 60 minutes, and produced 57 grams of polymer whose melt index on an unmilled sample was 0.83.

EXAMPLE 2

The catalyst used in this example was prepared essentially in the same manner as in Example 1 except for the final hold temperature in the activation cycle which was 1700° F. instead of 1600° F.

In accordance with the general procedure described in Example 1 the catalyst was tested twice. For catalyst charges of 0.1652 and 0.1910, and a run time of 60 minutes each, 83 and 134 grams of polymer were recovered, having the unmilled resin melt indices of 0.47 and 1.02, respectively. The reactivities were calculated to be 502 and 701 g/g catalyst/hour, respectively.

EXAMPLE 3

This example illustrates chemical modification of the support prior to the dispersion of chromium cupferronate thereon.

A catalyst used in this example was prepared by the following steps:

1. 400 grams of Davison MS-ID silica as received was impregnated with an aqueous solution prepared by dissolving 9.65 grams of zirconium tetrachloride in 1200 ml demineralized water, followed by drying at 230° F. in an oven equipped with mechanical convection until free flowing. Afterward, the temperature was raised to 400° F. and kept there for 4 hours in the same oven.

2. This zirconium tetrachloride-modified silica was then calcined in a muffle furnace by a heating cycle consisting of (a) hold at 400° F. for one hour, (b) raising 90° F. every 15 minutes up to 1200° F., (c) hold at 1200° F. for 4 hours, and (d) cool down to room temperature.

3. 30.0 grams of this zirconium-modified silica was then impregnated with a 90 ml acetone solution containing 2.7 grams of chromium cupferronate obtained by the method described in Example 1.

4. About 15 grams of this impregnated and partially dried catalyst was activated by the method described in Example 1 except the final hold temperature was 1700° F. instead of 1600° F.

The activated catalyst was evaluated twice in accordance with the general procedure described in Example 1. For catalyst charges of 0.1832 and 0.1797, and a run time of 60 minutes each, 97 and 140 grams of polymer were recovered, having the unmilled resin melt indices of 0.72 and 0.56, respectively. The reactivities were calculated to be 529 and 778 g/g catalyst/hour, respectively.

EXAMPLE 4

This example illustrates the invention with a chromium (III) derivative of N-phenylbenzohydroxamic acid, or chromium (III) N-phenylbenzohydroxamate.

The chromium chelate or derivative used in this example was prepared by the metathectical reaction between intermediate ammonium N-phenylbenzohydroxamate and chromium trichloride. Specifically, 12 grams of N-phenylbenzohydroxamic acid was added to 100 ml demineralized water, neutralized with ammonium hydroxide solution, and caused to dissolve completely by heating. After the pH of the reaction mixture was adjusted to about 8 with hydrochloric acid, it was mixed with a 30 ml aqueous solution containing 5 grams of chromium trichloride. The mixture was then heated to form a dark green precipitate, which was washed with 100 ml water for several times until no more soluble green color was observed in the wash water. After drying over mild heat, the precipitate was dissolved in 150 ml dichloromethane for removal of the insolubles. The filtrate was evaporated to the dark green residue weighing about 12 grams.

4.0 grams of chromium N-phenylbenzohydroxamate thus prepared was dissolved in 90 ml dichloromethane and the solution was used to impregnate 30 grams of the predried 952 MS-ID silica described in Example 1. About 15 grams of the impregnated and partially dried catalyst was activated essentially by the same method as in Example 1.

The activated catalyst was tested twice in accordance with the general procedure described in Example 1. For catalyst charges of 0.2692 and 0.1684, and run time of 60 minutes each, 158 and 119 grams of polymer were recovered, having the unmilled resin melt indices of 0.53 and 0.34, respectively. The reactivities were calculated to be 587 and 706 g/g catalyst/hour, respectively.

EXAMPLE 5

This example demonstrates the applicability of this invention to a chromium derivative of an aromatic hydroxamic acid without an N-substituent instead of with an N-substituent such as in Example 4.

The chromium derivative of benzohydroxamic acid used as a catalyst ingredient in this example was prepared by heating a mixture of 12 grams benzohydroxamic acid and 5.5 grams chromium (III) formate to the molten state, and maintaining this molten mixture at temperatures slightly above the initial melting point for two hours. The reaction product was washed with 100 ml water for five times, and dried over mild heat. After it was dissolved in 200 ml methyl ethyl ketone, the insolubles were filtered off, and the filtrate was evaporated to a tacky, dark brown substance, which hardened on cooling and weighed about 3.4 grams.

A catalyst was then prepared by impregnating 30 grams of the predried 952 MS-ID silica described in Example 1 with a solution prepared by dissolving 2.7 grams of the chromium derivative of benzohydroxamic acid just mentioned in 90 ml methyl ethyl ketone. About 15 grams of the impregnated and partially dried catalyst was activated according to the method described in Example 1.

The catalyst thus prepared was evaluated twice according to the general test procedure described in Example 1. For catalyst charges of 0.2120 and 0.2083 g, and run times of 75 and 60 minutes, respectively, 51 and 27 grams of polymer were recovered having the unmilled resin melt indices of 0.48 and 0.62, respectively.

Having described my invention as related to the embodiments described herein, it is my intention that the invention be not limited by any of the details of description, unless otherwise specified, but rather be construed broadly within its spirit and scope as set out in the appended claims.

I claim:

1. A catalyst prepared by dispersing on a finely divided, difficultly reducible, inorganic support of the class consisting of silica, alumina, thoria, zirconia, titania, magnesia, and mixtures thereof an organic nitrogen containing chromium compound essentially of the formula of the class consisting of

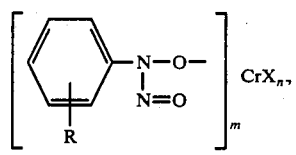

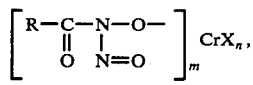

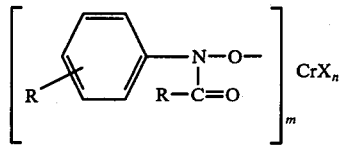

and

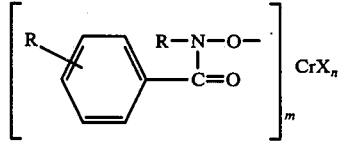

wherein R is individually selected from hydrogen, alkyl, alkenyl, aryl, cycloalkyl, cycloalkenyl, and arylalkyl radicals and combinations of these radicals with each R containing 0–20 carbon atoms and a corresponding valence-satisfying number of hydrogen atoms, $m$ is a whole number of 1 to 3, $n$ is a whole number of 0 to 2, and $m$ plus $n$ is 2 or 3, and X is an inorganic or organic negative group relative to chromium, and activating the resulting mixture by heating to and at an elevated temperature of from about 600°–2000° F. in a non-oxidizing atmosphere.

2. The catalyst of claim 1 wherein said chromium compound is essentially of the formula

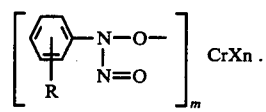

3. The catalyst of claim 1 wherein said chromium compound is essentially of the formula

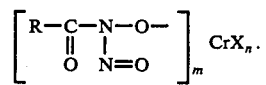

4. The catalyst of claim 1 wherein said chromium compound is essentially of the formula

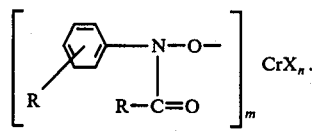

5. The catalyst of claim 1 wherein said chromium compound is essentially of the formula

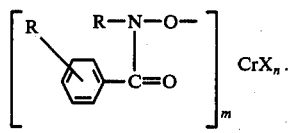

6. The catalyst of claim 1 wherein said support prior to the addition of said chromium compound is dried by heat pretreatment by heating at a temperature of from about 300°–2000° F. until volatile matter is at least partially driven off.

7. The catalyst of claim 1 wherein said chromium compound is dissolved in a solvent and the resulting solution used to impregnate said support.

8. The catalyst of claim 1 wherein said dispersing of said chromium compound is accomplished by dry blending with said finely divided support followed by heating in a fluid bed maintained in suspension with a non-oxidizing gas flowing through said support during said heating.

9. The catalyst of claim 1 wherein said activating is accomplished in a fluid bed maintained in suspension with the flow of a non-oxidizing gas.

10. The catalyst of claim 1 wherein said catalyst on a dry basis contains an amount of said chromium compound to provide about 0.05–10 wt.% of chromium.

11. The catalyst of claim 1 wherein said organic chromium compound is a member of the class consisting of chromium (III) cupferronate (chromium derivative of N-nitroso-N-phenylhydroxylamine), chromium (III) N-phenylbenzohydroxamate, chromium (III) benzohydroxamate, and chromium (III) N-nitroso-benzohydroxamate.

12. The method of making polymers of 1-olefins of 2 to 8 carbon atoms and copolymers of said olefins and 1-olefins of 2 to 20 carbon atoms which comprises polymerizing said olefins under polymerizing conditions with the catalyst of claim 1.

13. The method of making polymers of 1-olefins of 2 to 8 carbon atoms and copolymers of said olefins and 1-olefins of 2 to 20 carbon atoms which comprises polymerizing said olefins under polymerizing conditions with the catalyst of claim 2.

14. The method of making polymers of 1-olefins of 2 to 8 carbon atoms and copolymers of said olefins and 1-olefins of 2 to 20 carbon atoms which comprises polymerizing said olefins under polymerizing conditions with the catalyst of claim 3.

15. The method of making polymers of 1-olefins of 2 to 8 carbon atoms and copolymers of said olefins and 1-olefins of 2 to 20 carbon atoms which comprises polymerizing said olefins under polymerizing conditions with the catalyst of claim 4.

16. The method of making polymers of 1-olefins of 2 to 8 carbon atoms and copolymers of said olefins and 1-olefins of 2 to 20 carbon atoms which comprises polymerizing said olefins under polymerizing conditions with the catalyst of claim 5.

17. The method of making polymers of 1-olefins of 2 to 8 carbon atoms and copolymers of said olefins and 1-olefins of 2 to 20 carbon atoms which comprises polymerizing said olefins under polymerizing conditions with the catalyst of claim 6.

18. The method of making polymers of 1-olefins of 2 to 8 carbon atoms and copolymers of said olefins and 1-olefins of 2 to 20 carbon atoms which comprises polymerizing said olefins under polymerizing conditions with the catalyst of claim 7.

19. The method of making polymers of 1-olefins of 2 to 8 carbon atoms and copolymers of said olefins and 1-olefins of 2 to 20 carbon atoms which comprises polymerizing said olefins under polymerizing conditions with the catalyst of claim 8.

20. The method of making polymers of 1-olefins of 2 to 8 carbon atoms and copolymers of said olefins and 1-olefins of 2 to 20 carbon atoms which comprises polymerizing said olefins under polymerizing conditions with the catalyst of claim 9.

21. The method of making polymers of 1-olefins of 2 to 8 carbon atoms and copolymers of said olefins and 1-olefins of 2 to 20 carbon atoms which comprises polymerizing said olefins under polymerizing conditions with the catalyst of claim 10.

22. The method of making polymers of 1-olefins of 2 to 8 carbon atoms and copolymers of said olefins and 1-olefins of 2 to 20 carbon atoms which comprises polymerizing said olefins under polymerizing conditions with the catalyst of claim 11.

23. The process of preparing an active polymerization catalyst comprising the steps of dispersing on a finely divided, difficultly reducible, inorganic support of the class consisting of silica, alumina, thoria, zirconia, titania, magnesia, and mixtures thereof an organic nitrogen containing chromium compound essentially of the formula of the class consisting of

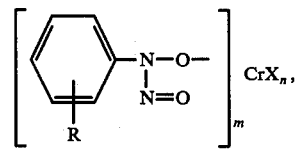

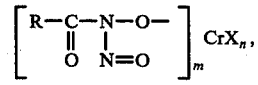

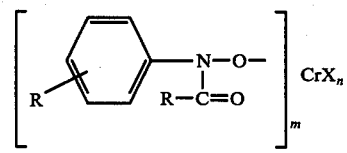

and

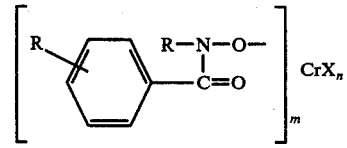

wherein R is individually selected from hydrogen, alky, alkenyl, aryl, cycloalkyl, cycloalkenyl, and arylalkyl radicals and combinations of these radicals with each R containing 0–20 carbon atoms and a corresponding valence-satisfying number of hydrogen atoms, $m$ is a whole number of 1 to 3, $n$ is a whole number of 0 to 2, and $m$ plus $n$ is 2 or 3, and X is an inorganic or organic negative group relative to chromium, and activating the resulting mixture by heating to and at an elevated temperature of from about 600°–2000° F. in a non-oxidizing atmosphere.

24. The process of claim 23 wherein said chromium compound is essentially of the formula

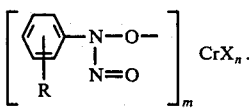

25. The process of claim 23 wherein said chromium compound is essentially of the formula

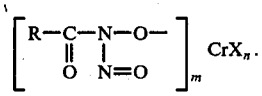

26. The process of claim 23 wherein said chromium compound is essentially of the formula

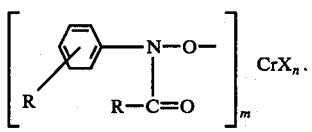

27. The process of claim 23 wherein said chromium compound is essentially of the formula

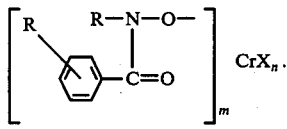

28. The process of claim 23 wherein said support prior to the addition of said chromium compound is dried by heat pretreatment by heating at a temperature of from about 300°–2000° F. until volatile matter is at least partially driven off.

29. The process of claim 23 wherein said chromium compound is dissolved in a solvent and the resulting solution used to impregnate said support.

30. The process of claim 23 wherein said dispersing of said chromium compound is accomplished by dry blending with said finely divided support followed by heating in a fluid bed maintained in suspension with a non-oxidizing gas flowing through said support during said heating.

31. The process of claim 23 wherein said activating is accomplished in a fluid bed maintained in suspension with the flow of a non-oxidizing gas.

32. The process of claim 23 wherein said catalyst on a dry basis contains an amount of said chromium compound to provide about 0.05–10 wt.% of chromium.

33. The process of claim 23 wherein said organic chromium compound is a member of the class consisting of chromium (III) cupferronate (chromium derivative of N-nitroso-N-phenylhydroxylamine), chromium (III) N-phenylbenzohydroxamate, chromium (III) benzohydroxamate, and chromium (III) N-nitroso-benzohydroxamate.

34. The process of claim 23 wherein said activating is in a stationary bed in a non-oxidizing atmosphere provided by evacuation of gas from said bed.

35. The process of claim 23 wherein said activating is in a stationary bed in a non-oxidizing atmosphere provided by a non-oxidizing gas.

36. The process of claim 31 wherein said non-oxidizing gas is selected from the class consisting of nitrogen, hydrogen, carbon monoxide, noble gases and mixtures of these gases.

37. The process of claim 23 wherein said activating is in a fluid bed using a non-oxidizing gas to maintain the mixture of support and said chromium compound in suspension while heating to a final activation temperature of from 850°–2000° F.

38. The process of claim 37 wherein said non-oxidizing gas is selected from the class consisting of nitrogen, hydrogen, carbon monoxide, noble gases and mixtures of these gases.

39. The process of claim 23 wherein said activating is in a fluid bed using a non-oxidizing gas to maintain the mixture of suppport and said chromium compound in a fluid condition while heating at activating temperatures of from about 300°–350° F. for from about 1 to 3 hours and then at about 550°–600° F. for about 1 to 3 hours to produce an interaction between the chromium compound and the support, followed by final activation at a temperature of about 850°–2000° F., for a period of about 0.5–12 hours.

40. The process of claim 35 wherein said non-oxidizing gas is selected from the class consisting of nitrogen, hydrogen, carbon monoxide, noble gases and mixtures of these gases.

41. The process of claim 39 wherein said non-oxidizing gas is selected from the class consisting of nitrogen, hydrogen, carbon monoxide, noble gases and mixtures of these gases.

* * * * *